United States Patent
Chou (10) Patent No.: US 10,013,356 B2
(45) Date of Patent: Jul. 3, 2018

(54) FACILITATING PREFETCHING FOR DATA STREAMS WITH MULTIPLE STRIDES

(71) Applicant: Oracle International Corporation, Redwood City, CA (US)

(72) Inventor: Yuan C. Chou, Los Gatos, CA (US)

(73) Assignee: ORACLE INTERNAIONAL CORPORATION, Redwood Shores, CA (US)

( * ) Notice: Subject to any disclaimer, the term of this patent is extended or adjusted under 35 U.S.C. 154(b) by 93 days.

(21) Appl. No.: 14/794,671

(22) Filed: Jul. 8, 2015

(65) Prior Publication Data
US 2017/0010970 A1    Jan. 12, 2017

(51) Int. Cl.
*G06F 12/08*     (2016.01)
*G06F 12/0862*   (2016.01)

(52) U.S. Cl.
CPC .. *G06F 12/0862* (2013.01); *G06F 2212/6024* (2013.01); *G06F 2212/6026* (2013.01)

(58) Field of Classification Search
CPC ............. G06F 12/0862; G06F 12/0842; G06F 2212/1021; G06F 2212/6026; G06F 2212/455; G06F 2212/602; G06F 2212/6024; G06F 2212/283

See application file for complete search history.

(56) References Cited

U.S. PATENT DOCUMENTS 7,487,296 B1 *   2/2009   Iacobovici .......... G06F 12/0862
                                                        711/137

* cited by examiner

*Primary Examiner* — David X Yi
*Assistant Examiner* — Zubair Ahmed
(74) *Attorney, Agent, or Firm* — Park, Vaughan, Fleming & Dowler LLP (57) ABSTRACT

The disclosed embodiments relate to a system that generates prefetches for a stream of data accesses with multiple strides. During operation, while a processor is generating the stream of data accesses, the system examines a sequence of strides associated with the stream of data accesses. Next, upon detecting a pattern having a single constant stride in the examined sequence of strides, the system issues prefetch instructions to prefetch a sequence of data cache lines consistent with the single constant stride. Similarly, upon detecting a recurring pattern having two or more different strides in the examined sequence of strides, the system issues prefetch instructions to prefetch a sequence of data cache lines consistent with the recurring pattern having two or more different strides.

20 Claims, 4 Drawing Sheets

PSB ENTRY 400

| STRIDES 402 | HEAD ADD 404 | TAIL ADD 406 | FOLLOW 408 | LIMIT 410 | HS 412 | TS 414 | PATTERN LENGTH 416 | REPLAC INFO 418 |
|---|---|---|---|---|---|---|---|---|

| S[0] | S[1] | S[2] |
|---|---|---|

```
while() {
    load x, x+1, x+2, …
}
```

```
while() {
    load₀ x,    x+4, x+8, …
    load₁ x+1, x+5, x+9, …
    load₂ x+2, x+6, x+10, …
    load₃ x+3, x+7, x+11, …
}
```

FACILITATING PREFETCHING FOR DATA STREAMS WITH MULTIPLE STRIDES

BACKGROUND

Field

The disclosed embodiments generally relate to techniques for improving performance in computer systems. More specifically, the disclosed embodiments relate to the design of a processor, which generates prefetches for data streams with recurring access patterns having multiple strides.

Related Art

As the gap between processor speed and memory performance continues to grow, prefetching is becoming an increasingly important technique for improving computer system performance. Prefetching involves pulling cache lines from memory and placing them into a cache before the cache lines are actually accessed by an application. This prevents the application from having to wait for a cache line to be retrieved from memory and thereby improves computer system performance.

Conventional stream data prefetchers, such as those implemented in Oracle Corporation's current generation of SPAR™ processors, can only generate prefetches for data streams having a single constant stride, wherein a stride indicates a distance between successive memory accesses in a data stream. However, many important applications generate data stream access patterns with multiple strides. These multi-stride streams act to confound a conventional stream prefetcher and render it largely ineffective.

Hence, what is needed is a prefetcher that generates prefetches for data streams having multiple strides.

SUMMARY

The disclosed embodiments relate to a system that generates prefetches for a stream of data accesses with multiple strides. During operation, while a processor is generating the stream of data accesses, the system examines a sequence of strides associated with the stream of data accesses. Next, upon detecting a pattern having a single constant stride in the examined sequence of strides, the system issues prefetch instructions to prefetch a sequence of data cache lines consistent with the single constant stride. Similarly, upon detecting a recurring pattern having two or more different strides in the examined sequence of strides, the system issues prefetch instructions to prefetch a sequence of data cache lines consistent with the recurring pattern having two or more different strides.

In some embodiments, prior to examining the sequence of strides, the system generates the sequence of strides, wherein each stride indicates a distance between addresses for consecutive memory references associated with the stream of data accesses.

In some embodiments, while generating the sequence of strides, the system keeps track of data cache misses in a prefetch learning table (PLT), wherein each entry in the PLT stores a data address for a preceding data cache miss and is indexed by a program counter for a specific load instruction that generated the preceding data cache miss. In these embodiments, while generating the sequence of strides, the system generates a load-instruction-specific sequence of strides indicating distances between data addresses for consecutive data cache misses generated by the specific load instruction. Moreover, while examining the sequence of strides, the system attempts to detect a load-instruction-specific pattern of strides for each entry in the PLT.

In some embodiments, each entry in the PLT stores a load-instruction-specific sequence of strides for a specific load instruction. In these embodiments, the load-instruction-specific sequence of strides is examined while attempting to detect a pattern of strides for the specific load instruction.

In some embodiments, while issuing the prefetch instructions for the single constant stride or the recurring sequence of two or more strides, the system uses a prefetch stream buffer (PSB) to keep track of prefetches for each detected pattern of strides, wherein each entry in the PSB is associated with a pattern of strides for a specific load instruction.

In some embodiments, when a load-instruction-specific pattern of strides is detected while examining the sequence of strides, the system: (1) allocates an entry in the PSB for the detected pattern of strides; and (2) possibly deallocates an entry in the PLT associated with the detected pattern of strides.

In some embodiments, when a new stride arises for an entry in the PSB, and the new stride is inconsistent with a pattern of strides in the entry, the system deallocates the entry from the PSB.

In some embodiments, while issuing the prefetch instructions, the system keeps track of a number of outstanding prefetches for each entry in the PSB. In these embodiments, the system also issues a prefetch instruction for a given entry in the PSB only if a number of outstanding prefetches for the given entry is below a maximum prefetch-ahead distance for the given entry.

In some embodiments, the system increases a maximum prefetch-ahead distance for an entry in the PSB when a pre-specified number of consecutive successful prefetches is detected for the entry.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, the disclosed embodiments relate to a technique for generating prefetches for data streams with recurring patterns having multiple strides. Before we describe how this technique operates, we first describe the structure of a computer system including a processor that implements this technique.

Computer System

Figure 1:
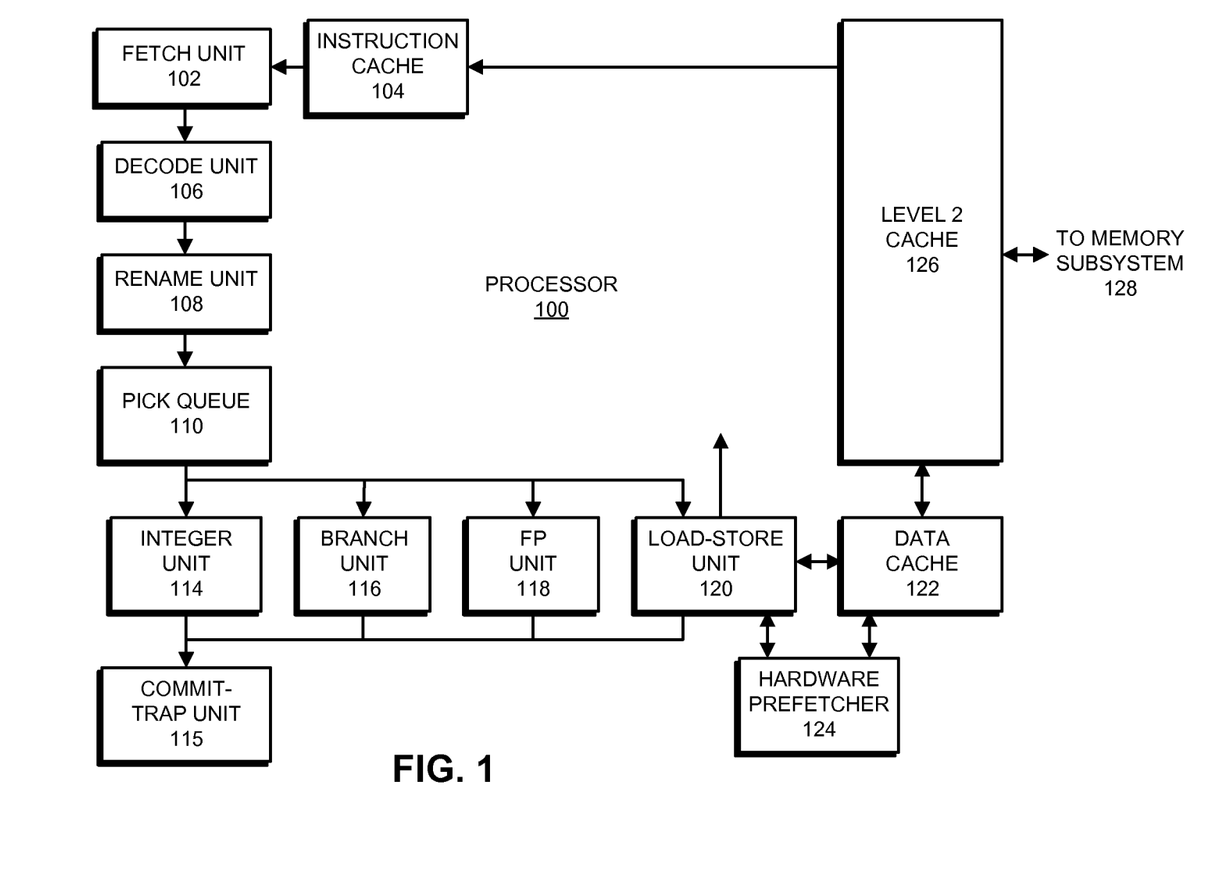
FIG. 1 illustrates a processor in accordance with disclosed embodiments.

FIG. 1 illustrates an exemplary computer system comprising a memory subsystem 128 and a processor 100 in accordance with disclosed embodiments. Processor 100 can include any type of computing engine that can make use of prefetching instructions, including a processor that is part of: a server computer system, a desktop computer system, a laptop computer system, a tablet computer system, a smartphone or a device controller.

Processor 100 includes a number of components that are illustrated in FIG. 1. On the right side of FIG. 1, memory subsystem 128 is coupled to a level 2 (L2) cache 126 within processor 100. Note that memory subsystem 128 can include a level 3 (L3) cache and a main memory. L2 cache 126 is coupled to both an instruction cache 104 and a data cache 122. During operation of processor 100, an instruction is retrieved from instruction cache 104 by instruction fetch unit 102. This instruction feeds into a decode unit 106 and then into a register renaming unit 108. Next, the instruction feeds into pick queue 110, where it waits to receive operands so it is ready to execute and is then sent to a functional unit for execution. These functional units include integer unit 114, branch unit 116, floating-point (FP) unit 118 and load-store unit 120. Note that load-store unit 120 moves operands between a register file and data cache 122. Load-store unit 120 is also coupled to a hardware prefetcher 124, which dynamically monitors data accesses and then selectively prefetches cache lines based on detected data access patterns. Finally, after the instruction passes through one of the functional units, the instruction is routed through commit-trap unit 115, which commits the result of the instruction to the architectural state of the processor.

Multi-Stride Access Patterns

The most commonly occurring type of memory access pattern has a constant stride. For example, a stream of memory accesses that produces the following data addresses (A, A+64, A+128, A+192, A+256, . . . ) has the following strides between consecutive data addresses (64, 64, 64, 64, . . . ). Hence, this stream has a constant stride of 64. In contrast, a stream that produces the following data addresses (A, A+64, A+192, A+320, A+384, A+512, A+640, . . . ) has the following strides (64, 128, 128, 64, 128, 128, . . . ). Note that this stream has a recurring pattern of three different strides ABBABB.

Embodiments of the prefetcher described below can detect multi-stride stream patterns with a pattern length of up to three. The detectable stride patterns are: A, AB, AAB, ABB, ABC, where each character A, B, and C represents a unique stride. In contrast, a conventional stream prefetcher is only able to generate prefetches for the first of the above stride patterns. Note that by using the same principles described below, the disclosed embodiments can easily be extended to detect and prefetch longer stride patterns having pattern lengths larger than three.

Hardware Prefetcher

Figure 2:
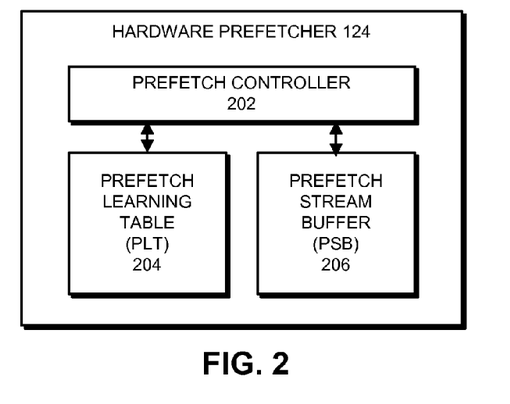
FIG. 2 illustrates the structure of a hardware prefetcher in accordance with disclosed embodiments.

FIG. 2 illustrates the structure of hardware prefetcher 124 in accordance with disclosed embodiments. Hardware prefetcher 124 comprises a number of components, including a prefetch controller 202, a prefetch learning table (PLT) 204 and a prefetch stream buffer (PSB) 206. Prefetch controller 202 includes sequential logic that accesses PLT 204 and PSB 206 and controls the operations performed by hardware prefetcher 124.

PLT 204 contains entries that store sequences of strides for specific load instructions. During operation, hardware prefetcher 124 attempts to detect recurring patterns of strides in these load-instruction-specific sequences of strides stored in PLT 204 and also captures the detected pattern of strides. Note that PLT 204 is accessed whenever the processor 100's load-store unit 120 executes a load instruction that misses data cache 122. Moreover, entries in PLT 204 are typically indexed using some bits from the load instruction's program counter (PC).

PSB 206 contains entries including state information for each detected pattern of strides. During operation, hardware prefetcher 124 uses the state information contained in the entries in PSB 206 to generate prefetches for streams that have been detected by the PLT 204 as is described in more detail below. In some embodiments, PSB 206 is a fully associative hardware structure.

Note that the particular type of hardware prefetcher 124 described in this specification generates prefetch instructions based on detected access patterns for individual load instructions. However, other types of prefetchers do not detect access patterns for individual load instructions, but instead look for access patterns in the aggregate stream of data accesses generated by the processor without regard to which load instructions generated the accesses. However, the technique for generating prefetches for data streams with multiple strides described in this specification can be applied to both types of prefetchers, and is not meant to be limited to load-instruction-specific prefetchers that detect access patterns for individual load instructions. Note that the load-instruction-specific variation of this technique described in this specification is more complicated than the variation that does not consider individual load instructions. Hence, the load-instruction-specific variation can easily be simplified by one skilled in the art to produce an implementation that does not consider load instructions.

Prefetch Learning Table Entry

Figure 3:
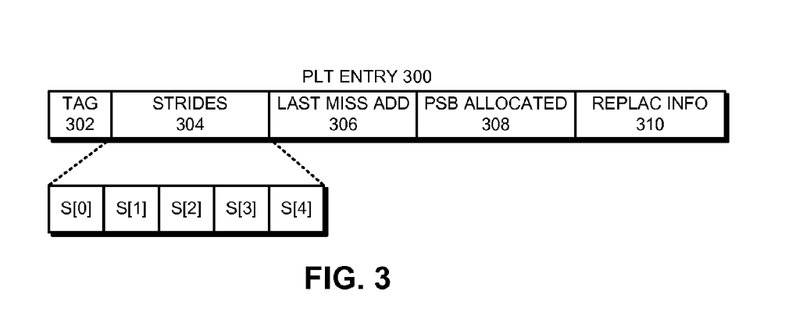
FIG. 3 illustrates the structure of a prefetch learning table (PLT) entry in accordance with disclosed embodiments.

FIG. 3 illustrates the structure of an exemplary PLT entry 300 maintained in PLT 204 in accordance with disclosed embodiments. PLT entry 300 contains the following fields:

tag 302, strides 304, last miss address 306, PSB allocated 308 and replacement information 310. Note that PLT entry 300 is associated with a specific load instruction, and tag field 302 contains a hash of some of the bits of the program counter (PC) for this load instruction. Strides field 304 contains the last five strides S[0], S[1], S[2], S[3] and S[4] that were detected for the load instruction, wherein S[0] contains the most recently detected stride. Last miss address field 306 contains the data address for the last cache miss generated by the load instruction. PSB allocated field 308 indicates whether a corresponding entry in PSB 206 has been created for PLT entry 300. Finally, replacement information 310 contains state information that is used to implement a replacement policy for entries in PLT 204.

When a load instruction causes a miss in data cache 122, hardware prefetcher 124 performs a lookup in PLT 204 based on the PC for the load instruction to detect a matching tag field in an entry in PLT 204. If this lookup does not return a matching entry, a new entry is allocated for the load instruction. Next, the load instruction's data address is copied into the last miss address field 306 of PLT entry 300 and at least some bits of the load instruction's PC are used to generate a tag value that is stored in the tag field 302. The strides field 304, which contains the five last stride values S[0], S[1], S[2], S[3] and S[4] for the load instruction, is initialized to all zeros.

On the other hand, if the load instruction that missed the data cache finds a matching entry in PLT 204, the latest stride is calculated by calculating the difference between the load instruction's data address and the last miss address field 306. Hardware prefetcher 124 then makes a number of comparisons while attempting to detect stride patterns, wherein these comparisons involve the latest stride and the five stride fields S[0], S[1], S[2], S[3] and S[4]. A pattern length of three is detected when the following conditions are met: latest stride==stride[2] and stride[0]==stride[3] and stride[1]==stride[4]. A pattern length of two is detected when the following conditions are met: latest stride==stride[1] and stride [0]==stride[1]. Finally, a pattern length of one is detected when the following condition is met: latest stride==stride[0].

If multiple stride patterns are detected, the stride pattern with the longest pattern length is chosen. When a stride pattern (regardless of pattern length) is detected while examining PLT entry 300, and no corresponding entry has been allocated in PSB 206, a new entry is allocated for the detected pattern in PSB 206. Note that if the detected pattern's length is one, PLT entry 300 is not deallocated because the stream may turn out to have a longer stride pattern (e.g., if the stride pattern is AAB); instead, the PSB allocated field 308 is set to one. On the other hand, if the detected pattern length is two or three, PLT entry 300 is deallocated, and if the PSB allocated field was set to one, the PSB entry that was allocated earlier for PLT entry 300 is deallocated.

Finally, if no pattern is detected, the PLT entry's stride fields are updated as follows: stride[5]==stride[4]; stride[4]==stride[3]; stride[3]==stride[2]; stride[2]==stride [1]; stride[1]==stride[0]; and stride[0]==latest stride.

Prefetch Stream Buffer Entry

Figure 4:
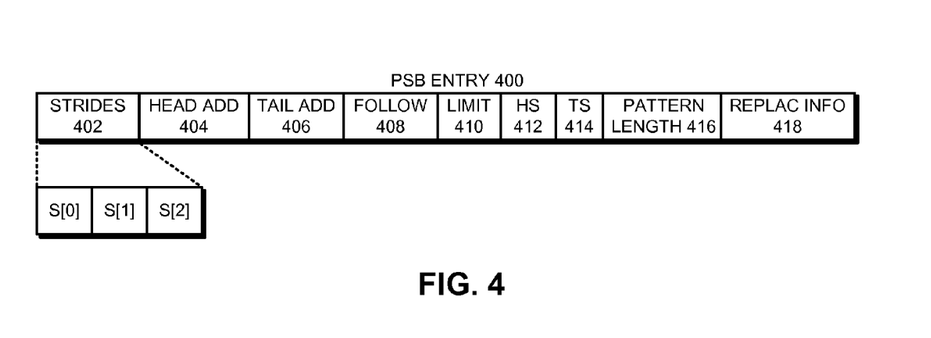
FIG. 4 illustrates the structure of a prefetch stream buffer (PSB) entry in accordance with disclosed embodiments.

FIG. 4 illustrates the structure of a prefetch stream buffer (PSB) entry 400 in accordance with disclosed embodiments. PSB entry 400 includes the following fields: strides 402, head address 404, tail address 406, follow 408, limit 410, hs 412, ts 414, pattern length 416 and replacement information 418. Strides field 402 includes fields for three stride values S[0], S[1] and S[2], wherein the three stride values comprise a detected pattern of strides. Head address field 404 contains the data address of the next prefetch that will be issued for the stream, and tail address field 406 contains the expected data address of the next demand access for this stream. Follow field 408 contains a count of the number of issued prefetches that have not been consumed by a demand access, and limit field 410 stores the maximum prefetch-ahead distance. The hs field 412 and ts field 414 indicate which of the three strides should be used for the next update of the head address and tail address fields respectively, and the pattern length field 416 indicates the length of the stride pattern. Finally, replacement information 418 contains state information that is used to implement a replacement policy for entries in PSB 206.

Figure 5:
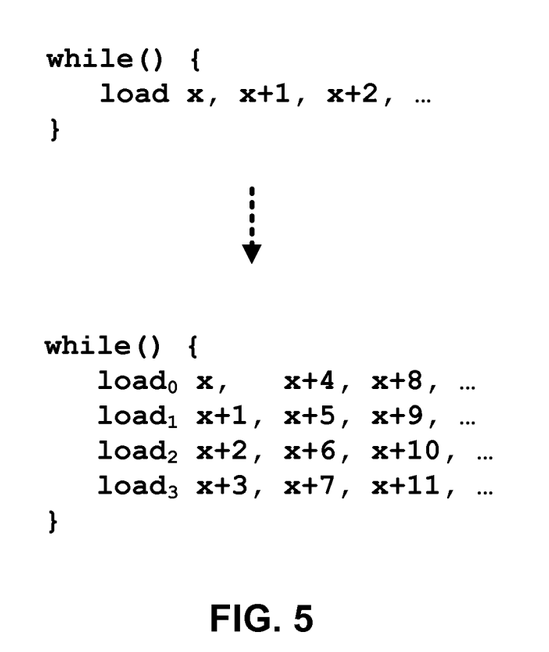
FIG. 5 presents exemplary data accesses associated with a loop that is unrolled in accordance with the disclosed embodiments.

Note that PSB entry 400 can include multiple entries. For example, the top portion of FIG. 5 illustrates how a while( ) loop that contains a single load instruction "load" can generate a stream of references (x, x+1, x+2, . . . ) with a stride of one. In this case, the PSB 206 will contain a single entry for this single load instruction "load," wherein the entry has a stride of one. In contrast, the bottom portion of FIG. 5 illustrates how unrolling the while( ) loop four times causes the while( ) loop to contain four separate load instructions $load_0$, $load_1$, $load_2$, $load_3$ that generate respective streams of references (x, x+4, x+8, . . . ), (x+1, x+5, x+9, . . . ), (x+2, x+6, x+10, . . . ), (x+3, x+7, x+11, . . . ) that each have a stride of four. In this case, PSB 206 will contain four entries; one for each of the load instructions $load_0$, $load_1$, $load_2$, $load_3$, wherein each entry has a stride of four.

A new PSB entry 400 is allocated in PSB 206 from a corresponding PLT entry 300 as follows. First, the detected pattern of one to three strides from strides field 304 of PLT entry 300 is copied into corresponding strides S[0], S[1] and S[2] in strides field 402 of PSB entry 400. Also, head address field 404 is initialized to the sum of the load instruction's data address and the first stride field S[0] of PLT entry 300. The initial value of the tail address field 406 can be computed in two ways that depend on the specific implementation. In a first implementation (option 1), it is computed to be the same value as the head address field 404. In contrast, in a second implementation (option 2), tail address field 406 is computed based on the pattern length as is described in more detail below. The follow field 408 is initialized to zero and the limit field is set to the initial maximum prefetch-ahead distance (e.g., 4). If the detected pattern length is two or three, PLT entry 300 is deallocated. Otherwise, if the detected pattern length is one, PLT entry 300 is not deallocated because the stream may turn out to have a longer stride pattern that still needs to be detected.

Note that PSB 206 is accessed whenever processor 100's load-store unit 120 executes a load instruction (regardless of whether the instruction hit or missed the data cache). The load instruction's data address is checked against the tail address field 406 of every entry in PSB 206. If there is a match, the matching entry's tail address field 406 is updated by adding the current stride to its current value. More specifically, the PSB entry 400's tail address field 406 and ts field 414 are updated as follows:

tail address=tail address+S[ts]

ts=(ts+1) % pattern length

Also, follow field 408 is decremented by one if it is not already zero. In some implementations, the limit field is also incremented by one if it is not already at some predefined maximum value.

Prefetches are issued for PSB entries in the following manner. During every execution cycle, if load-store unit 120 is able to accept a new prefetch, the entries in PSB 206 are scanned in a round robin order. If the follow field 408 of an entry is less than its corresponding limit field 410, a prefetch is issued for the data address found in the entry's head address field 404. Next, the PSB entry 400's head address field 404 and hs field 412 are updated as follows:

head address=head address+S[hs]
hs=(hs+1) % pattern length

In addition, PSB entry 400's follow field 408 is incremented by one.

The initial values of these fields, which are set when PSB entry 400 is allocated, depend on the pattern length detected by the PLT. For a pattern length of three, the initial values can be set as follows:

PSB S[0]=PLT S[1]
PSB S[1]=PLT S[0]
PSB S[2]=latest stride
PSB head address=load data address+PSB S[0]
PSB tail address=load data address+PSB S[0] (Option 1)
PSB tail address=load data address+PSB S[0] (Option 2)+PSB S[1]+PSB S[2]+PSB S[0]
PSB pattern length=3
PSB hs=1
PSB ts=1.

Note that two options (1 and 2) are presented for computing the tail address.

For a pattern length of two, the initial values can be set as follows:

PSB S[0]=PLT S[0]
PSB S[1]=latest stride
PSB head address=load data address+PSB S[0]
PSB tail address=load data address+PSB S[0] (Option 1)
PSB tail address=load data address+PSB S[0] (Option 2)+PSB S[1]+PSB S[0]+PSB S[1]
PSB pattern length=2
PSB hs=1
PSB ts=0

Note that two options (1 and 2) are presented for computing the tail address.

Finally, for a pattern length of one, the initial values can be set as follows:

PSB S[0]=latest stride
PSB head address=load data address+PSB S[0]
PSB tail address=load data address+PSB S[0] (Option 1)
PSB tail address=load data address+PSB S[0] (Option 2)+PSB S[0]+PSB S[0]+PSB S[0]
PSB pattern length=1
PSB hs=0
PSB ts=0

Note that two options (1 and 2) are presented for computing the tail address.

In some embodiments, the system increases the maximum prefetch-ahead distance for an entry in the PSB when a pre-specified number of consecutive successful prefetches are detected for the entry. For example, the prefetch ahead distance stored in the limit field 410 of PSB entry 400 can be increased from four to eight after a predetermined number of successful predictions, and then again from eight to 16 after even more successful predictions.

The above-described embodiments enable a stream prefetcher to effectively generate prefetches for data streams having multiple strides, thereby improving processor performance on applications with data access patterns comprising multiple strides.

Process of Generating Prefetches

Figure 6:
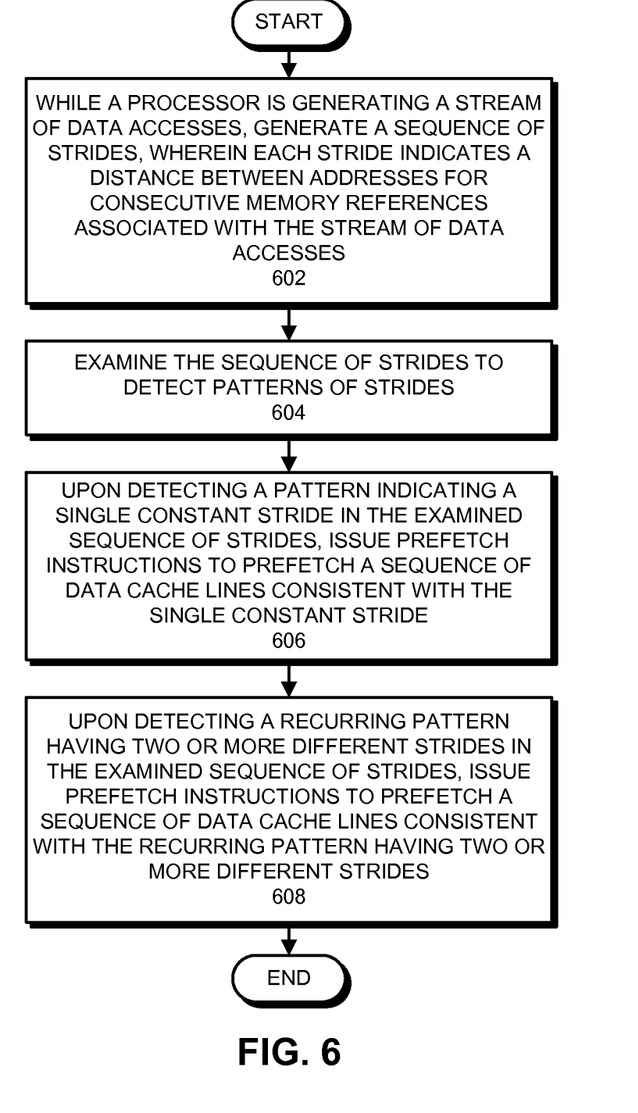
FIG. 6 presents a flow chart illustrating how the prefetcher generates prefetches in accordance with the disclosed embodiments.

FIG. 6 presents a flow chart illustrating how the hardware prefetcher 124 generates prefetches in accordance with the disclosed embodiments. During operation, while a processor is generating the stream of data accesses, the system generates a sequence of strides, wherein each stride indicates a distance between addresses for consecutive memory references associated with the stream of data accesses (step 602).

Next, the system examines the sequence of strides to detect patterns of strides (step 604). Upon detecting a pattern indicating a single constant stride in the examined sequence of strides, the system issues prefetch instructions to prefetch a sequence of data cache lines consistent with the single constant stride (step 606). Similarly, upon detecting a recurring pattern having two or more different strides in the examined sequence of strides, the system issues prefetch instructions to prefetch a sequence of data cache lines consistent with the recurring pattern having two or more different strides (step 608).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating prefetches for a stream of data accesses with multiple strides, comprising:
while a processor is generating the stream of data accesses, examining a sequence of strides associated with data addresses for the stream of data accesses, wherein examining the sequence of strides involves:
creating a prefetch learning table (PLT) entry for each load instruction, wherein the PLT entry comprises a set of most recently detected strides,
detecting a longest stride pattern, and
storing the longest stride pattern in a prefetch stream buffer (PSB) entry that comprises the longest stride pattern, and wherein the PSB entry comprises fields that indicate which of the strides in the longest stride pattern should be used for the next update of a head address field and a tail address field;
upon detecting a pattern having a single constant stride in the examined sequence of strides, issuing prefetch instructions to prefetch a sequence of data cache lines consistent with the single constant stride; and
upon detecting a recurring pattern having two or more different strides in the examined sequence of strides, issuing prefetch instructions to prefetch a sequence of data cache lines consistent with the recurring pattern having two or more different strides.

2. The method of claim 1, wherein prior to examining the sequence of strides, the method further comprises generating the sequence of strides, wherein each stride indicates a distance between addresses for consecutive memory references associated with the stream of data accesses.

3. The method of claim 2,
wherein while generating the sequence of strides, the method keeps track of data cache misses in the prefetch learning table, wherein each entry in the PLT stores a data address for a preceding data cache miss and is indexed by a program counter for a specific load instruction that generated the preceding data cache miss;
wherein generating the sequence of strides includes generating a load-instruction-specific sequence of strides indicating distances between data addresses for consecutive data cache misses generated by the specific load instruction; and wherein examining the sequence of strides includes attempting to detect a load-instruction-specific pattern of strides for each entry in the PLT.

4. The method of claim 3,
wherein each entry in the PLT stores a load-instruction-specific sequence of strides for a specific load instruction; and
wherein the load-instruction-specific sequence of strides is examined while attempting to detect a pattern of strides for the specific load instruction.

5. The method of claim 3, wherein issuing the prefetch instructions for the single constant stride or the recurring pattern of two or more different strides includes using the prefetch stream buffer to keep track of prefetches for each detected pattern of strides, wherein each entry in the PSB is associated with a pattern of strides for a specific load instruction.

6. The method of claim 5, wherein when a load-instruction-specific pattern of strides is detected while examining the sequence of strides, the method further comprises:
allocating an entry in the PSB for the detected pattern of strides; and
selectively deallocating an entry in the PLT associated with the detected pattern of strides.

7. The method of claim 5, wherein when a new stride arises for an entry in the PSB, and the new stride is inconsistent with a pattern of strides in the entry, the method further comprises deallocating the entry from the PSB.

8. The method of claim 5, wherein issuing the prefetch instructions includes:
keeping track of a number of outstanding prefetches for each entry in the PSB; and
issuing a prefetch instruction for a given entry in the PSB only if a number of outstanding prefetches for the given entry is below a maximum prefetch-ahead distance for the given entry.

9. The method of claim 8, wherein the method further comprises increasing a maximum prefetch-ahead distance for an entry in the PSB when a pre-specified number of consecutive successful prefetches is detected for the entry.

10. A processor that generates prefetches for a stream of data accesses with multiple strides, comprising:
an instruction cache;
a data cache; and
an execution mechanism, wherein the execution mechanism includes a prefetcher that prefetches data cache lines;
wherein while the processor is generating the stream of data accesses, the prefetcher examines a sequence of strides associated with data addresses for the stream of data accesses, wherein examining the sequence of strides involves:
creating a prefetch learning table (PLT) entry for each load instruction, wherein the PLT entry comprises a set of most recently detected strides,
detecting a longest stride pattern up to three strides, and storing the longest stride pattern in a prefetch stream buffer (PSB) entry that comprises the longest stride pattern represented by three strides, and wherein the PSB entry comprises two fields that indicate which of the three strides in the longest stride pattern should be used for the next update of a head address field and a tail address field;
wherein upon detecting a pattern having a single constant stride in the examined sequence of strides, the prefetcher issues prefetch instructions to prefetch a sequence of data cache lines consistent with the single constant stride; and
wherein upon detecting a recurring pattern having two or more different strides in the examined sequence of strides, the prefetcher issues prefetch instructions to prefetch a sequence of data cache lines consistent with the recurring pattern having two or more different strides.

11. The processor of claim 10, wherein prior to examining the sequence of strides, the prefetcher generates the sequence of strides, wherein each stride indicates a distance between addresses for consecutive memory references associated with the stream of data accesses.

12. The processor of claim 11,
wherein the prefetcher includes the prefetch learning table;
wherein while generating the sequence of strides, the prefetcher keeps track of data cache misses in the PLT, wherein each entry in the PLT stores a data address for a preceding data cache miss and is indexed by a program counter for a specific load instruction that generated the preceding data cache miss;
wherein while generating the sequence of strides, the prefetcher generates a load-instruction-specific sequence of strides indicating distances between data addresses for consecutive data cache misses generated by the specific load instruction; and
wherein while examining the sequence of strides, the prefetcher attempts to detect a load-instruction-specific pattern of strides for each entry in the PLT.

13. The processor of claim 12,
wherein each entry in the PLT stores a load-instruction-specific sequence of strides for a specific load instruction; and
wherein the prefetcher examines a load-instruction-specific sequence of strides while attempting to detect a pattern of strides for the specific load instruction.

14. The processor of claim 12,
wherein the prefetcher includes the prefetch stream buffer; and
wherein while issuing the prefetch instructions for the single constant stride or the recurring pattern of two or more different strides, the prefetcher uses the PSB to keep track of prefetches for each detected pattern of strides, wherein each entry in the PSB is associated with a pattern of strides for a specific load instruction.

15. The processor of claim 14, wherein when a load-instruction-specific pattern of strides is detected while examining the sequence of strides, the prefetcher:
allocates an entry in the PSB for the detected pattern of strides; and
selectively deallocates an entry in the PLT associated with the detected pattern of strides.

16. The processor of claim 14, wherein when a new stride arises for an entry in the PSB, and the new stride is inconsistent with a pattern of strides in the entry, the prefetcher deallocates the entry from the PSB.

17. The processor of claim 14, wherein while issuing the prefetch instructions, the prefetcher:
keeps track of a number of outstanding prefetches for each entry in the PSB; and
issues a prefetch instruction for a given entry in the PSB only if a number of outstanding prefetches for the given entry is below a maximum prefetch-ahead distance for the given entry.

18. The processor of claim 17, wherein the prefetcher increases a maximum prefetch-ahead distance for an entry in the PSB when a pre-specified number of consecutive successful prefetches is detected for the entry.

19. A computer system with a processor that generates prefetches for a stream of data accesses with multiple strides, comprising:
a processor that includes an instruction cache, a data cache, and a prefetcher that prefetches data cache lines; and
a memory;
wherein while the processor is generating the stream of data accesses, the prefetcher examines a sequence of strides associated with data addresses for the stream of data accesses, wherein examining the sequence of strides involves:
creating a prefetch learning table (PLT) entry for each load instruction, wherein the PLT entry comprises a set of most recently detected strides,
detecting a longest stride pattern, and
storing the longest stride pattern in a prefetch stream buffer (PSB) entry that comprises the longest stride pattern, and wherein the PSB entry comprises two fields that indicate which of the strides in the longest stride pattern should be used for the next update of a head address field and a tail address field;
wherein upon detecting a pattern having a single constant stride in the examined sequence of strides, the prefetcher issues prefetch instructions to prefetch a sequence of data cache lines consistent with the single constant stride; and
wherein upon detecting a recurring pattern having two or more different strides in the examined sequence of strides, the prefetcher issues prefetch instructions to prefetch a sequence of data cache lines consistent with the recurring pattern having two or more different strides.

20. The computer system of claim 19, wherein prior to examining the sequence of strides, the prefetcher generates the sequence of strides, wherein each stride indicates a distance between addresses for consecutive memory references associated with the stream of data accesses.

* * * * *

UNITED STATES PATENT AND TRADEMARK OFFICE
CERTIFICATE OF CORRECTION

Page 1 of 1

PATENT NO.         : 10,013,356 B2
APPLICATION NO.    : 14/794671
DATED              : July 3, 2018
INVENTOR(S)        : Chou It is certified that error appears in the above-identified patent and that said Letters Patent is hereby corrected as shown below:

On the Title Page

Item [73], delete "INTERNAIONAL" and insert -- INTERNATIONAL --, therefor.

In the Specification

Column 1, Line 24, delete "SPAR™" and insert -- SPARC™ --, therefor.

Column 5, Line 57, delete "stride[5]==stride[4];" and insert -- stride[5]=stride[4]; --, therefor.

Column 5, Line 58, delete "stride[4]==stride[3];" and insert -- stride[4]=stride[3]; --, therefor.

Column 5, Line 58, delete "stride[3]==stride[2];" and insert -- stride[3]=stride[2]; --, therefor.

Column 5, Line 58-59, delete "stride[2]==stride[1];" and insert -- stride[2]=stride[1]; --, therefor.

Column 5, Line 59, delete "stride[1]==stride[0];" and insert -- stride[1]=stride[0]; --, therefor.

Column 5, Line 59, delete "stride[0]==latest stride." and insert -- stride[0]=latest stride. --, therefor.

Column 7, Line 23, after "1" delete ".".

Signed and Sealed this
Second Day of April, 2019

Andrei Iancu
*Director of the United States Patent and Trademark Office*